(12) United States Patent
Li et al.

(10) Patent No.: US 12,710,122 B2
(45) Date of Patent: Aug. 18, 2026

(54) PIPELINE FIXING MEMBER, VEHICLE SYSTEM, AND VEHICLE

(71) Applicant: BYD COMPANY LIMITED, Shenzhen (CN)

(72) Inventors: Yihui Li, Shenzhen (CN); Wei Xiong, Shenzhen (CN); Yugang Yao, Shenzhen (CN)

(73) Assignee: BYD Company Limited, Shenzhen (CN)

( * ) Notice: Subject to any disclaimer, the term of this patent is extended or adjusted under 35 U.S.C. 154(b) by 0 days.

(21) Appl. No.: 19/193,123

(22) Filed: Apr. 29, 2025

(65) Prior Publication Data

US 2025/0257838 A1 Aug. 14, 2025

Related U.S. Application Data

(63) Continuation of application No. PCT/CN2023/108508, filed on Jul. 21, 2023.

(30) Foreign Application Priority Data

Oct. 31, 2022 (CN) ......................... 202222892105.5

(51) Int. Cl.
*F16L 43/02* (2006.01)
*B60T 17/04* (2006.01)

(52) U.S. Cl.
CPC ............ *F16L 43/02* (2013.01); *B60T 17/043* (2013.01)

(58) Field of Classification Search
CPC ......... F16L 41/08; F16L 41/086; F16L 41/02; F16L 41/00; F16L 25/08; F16L 47/12; F16L 47/26; F16L 47/28; F16L 43/00; F16L 43/001; F16L 43/008; F16L 43/02; B60T 17/043
See application file for complete search history.

(56) References Cited

FOREIGN PATENT DOCUMENTS

| | | | | |
|---|---|---|---|---|
| AU | 8348482 | A | 11/1982 | |
| CN | 108644500 | A | 10/2018 | |
| CN | 211083164 | U | 7/2020 | |
| CN | 212796837 | U | 3/2021 | |
| CN | 214331841 | U | 10/2021 | |
| CN | 214775833 | U | 11/2021 | |
| CN | 215908613 | U | 2/2022 | |
| CN | 217029116 | U | 7/2022 | |
| CN | 217301979 | U | 8/2022 | |
| CN | 218463643 | U | 2/2023 | |
| JP | 2008254590 | A | 10/2008 | |
| WO | WO-2004056635 | A1 * | 7/2004 | ............ G06Q 40/08 |
| WO | 2015/155459 | A1 | 10/2015 | |

OTHER PUBLICATIONS

International Search Report and Written Opinion for Application No. PCT/CN2023/108508, mailed on Oct. 24, 2023, 11 pages.

* cited by examiner

*Primary Examiner* — Aaron M Dunwoody

(74) *Attorney, Agent, or Firm* — Sheppard Mullin Richter & Hampton LLP

(57) ABSTRACT

A pipeline fixing member includes a fixing member body. The fixing member body has a mounting portion, a flow channel, a first port, and a second port. The first port and the second port are respectively located at both ends of the flow channel. The first port is configured to be connected to a pipeline of the vehicle system. The second port is configured to be connected to a cylinder block of the vehicle system. The mounting portion is connected to the cylinder block of the vehicle system.

16 Claims, 4 Drawing Sheets

PIPELINE FIXING MEMBER, VEHICLE SYSTEM, AND VEHICLE

CROSS-REFERENCE TO RELATED APPLICATIONS

This application is a continuation application of International Patent Application No. PCT/CN2023/108508, filed on Jul. 21, 2023, which is based on and claims priority and benefits of Chinese Patent Application No. 202222892105.5, filed on Oct. 31, 2022. The entire content of all of the above-referenced applications is incorporated herein by reference.

FIELD

The present disclosure relates to the field of vehicle technologies, particularly, to a pipeline fixing member, a vehicle system, and a vehicle.

BACKGROUND

In the related art, a brake fluid pipeline of a vehicle is plugged in a cylinder block, so that brake fluid may flow into the cylinder block through the brake fluid pipeline.

However, in the related art, a size of a pipeline matching a cylinder block is fixed with low adaptability. In addition, the brake fluid pipeline may rotate relative to the cylinder block. In this way, relatively poor connection reliability between the brake fluid pipeline and the cylinder block is caused.

SUMMARY

The present disclosure, at least to some extent, resolves one of technical problems in the related art.

Therefore, an aspect of the present disclosure is to provide a pipeline fixing member. The pipeline fixing member may effectively limit rotation of a pipeline relative to a cylinder block, so that connection reliability between the pipeline and the cylinder block may be improved.

Another aspect of the present disclosure is to provide a vehicle system.

Still another aspect of the present disclosure is to provide a vehicle.

The pipeline fixing member provided according to the present disclosure includes:

- a fixing member body. The fixing member body has a mounting portion, a flow channel, a first port, and a second port. The first port and the second port are respectively located at both ends of the flow channel. The first port is configured to be connected to a pipeline of the vehicle system. The second port is configured to be connected to a cylinder block of the vehicle system. The mounting portion is connected to the cylinder block of the vehicle system.

According to the pipeline fixing member provided in the present disclosure, with the use of the fixing member body, the pipeline is in communication with the cylinder block. In this way, connection reliability between the pipeline and the cylinder block may be effectively improved, to cause the brake fluid to stably flow into the cylinder block. With the use of the mounting portion, the fixing member body is fixedly mounted on the cylinder block. In this way, rotation of the fixing member body relative to the cylinder block may be effectively limited, so that stability and reliability of a connection between the pipeline and the cylinder block may be improved. Further, a phenomenon of rotation of the pipeline relative to the cylinder block is avoided, so that brake fluid in a fluid reservoir may be ensured to flow into the cylinder block in a relatively stable manner. In addition, an assembly manner between the pipeline fixing member and the cylinder block provided in the present disclosure is relatively simple, and the pipeline fixing member may be easily disassembled from the cylinder block and repaired. In this way, subsequent repair and replacement costs may be greatly reduced. In addition, the pipeline fixing member provided in the present disclosure further has relatively high adaptability. The pipeline fixing member may be matched with and adapted to different sizes of pipelines.

The vehicle system provided according to the present disclosure includes:

- a cylinder block, where the cylinder block is the cylinder block of the foregoing vehicle system, and the cylinder block has an assembly hole;
- a sealing sleeve, where the sealing sleeve is mounted in the assembly hole; and
- a pipeline and a pipeline fixing member, where the pipeline fixing member is the foregoing pipeline fixing member. The sealing sleeve is sleeved over the pipeline fixing member to connect the pipeline fixing member to the cylinder block. The pipeline is the pipeline according to the foregoing vehicle system. The pipeline is mounted on the pipeline fixing member to configure the pipeline fixing member to be in communication with the cylinder block and the pipeline.

A vehicle provided according to the present disclosure includes the foregoing vehicle system.

Additional aspects and advantages of the present disclosure will be partly given in the following description, some of which will become apparent from the following description or may be learned from practices of the present disclosure.

DETAILED DESCRIPTION

Figure 1:
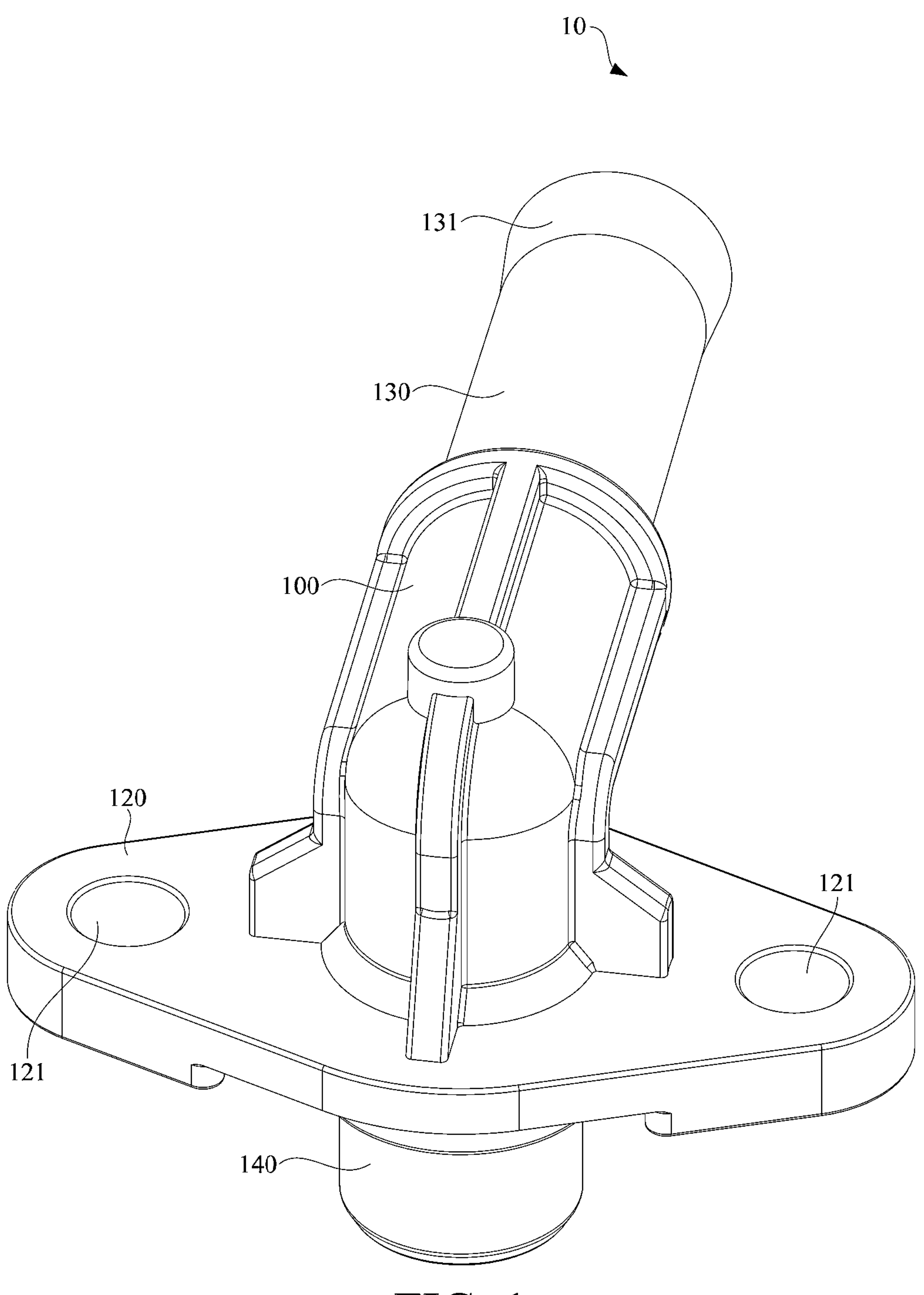
FIG. 1 is a schematic structural diagram of a pipeline fixing member according to an embodiment of the present disclosure.

In order to make objectives, technical solutions, and advantages of embodiments of the present disclosure clearer, the technical solutions in the embodiments of the present disclosure will be clearly and completely described in the following with reference to accompanying drawings in the embodiments of the present disclosure. Apparently, the embodiments to be described are only a part rather than all of the embodiments of the present disclosure. All other embodiments obtained by a person of ordinary skill in the art based on the embodiments of the present disclosure without creative efforts shall fall within the protection scope of the present disclosure.

In description of the present disclosure, it should be understood that an orientation or position relationship indicated by terms such as "center", "longitudinal", "transverse", "length", "width", "thickness", "above/over/on", "below/under/beneath", "front", "rear", "left", "right", "vertical", "horizontal", "top", "bottom", "inner", "outer", "clockwise", "anticlockwise", "axial", "radial", and "circumferential" is an orientation or position relationship based on what is shown in the accompanying drawings. The terms are merely for ease of describing the present disclosure and simplifying the description, but does not indicate or imply that the indicated apparatus or component needs to have an orientation, and is constructed and operated in the orientation, and therefore cannot be understood as a limitation to the present disclosure. In addition, a feature defined to be "first" or "second" may explicitly or implicitly include one or more features. In the description of the present disclosure, unless otherwise specified, "a number of/a plurality of" means two or more.

In the description of the present disclosure, it should be noted that, unless otherwise clearly specified and defined, terms "mount", "in communication with", and "connect" should be understood in a broad sense. For example, the term "connect" may be "fixedly connected", "detachably connected", or "integrally connected". Alternatively, the term "connect" may be "mechanically connected", or "electrically connected". The term "in communication with" may be "in direct communication with", "in indirect communication with" through an intermediate medium, or "in internal communication with" between two components. A person of ordinary skill in the art may understand meanings of the foregoing terms in the present disclosure in cases.

The following describes the embodiments of the present disclosure in detail. Examples of the embodiments are shown in the accompanying drawings, and same or similar labels all along in all the accompanying drawings indicate same or similar components or components having same or similar functions. The following embodiments that are described by referring to the accompany drawings are examples, and are only used to interpret the present disclosure, and cannot be understood as a limitation to the present disclosure.

Figure 2:
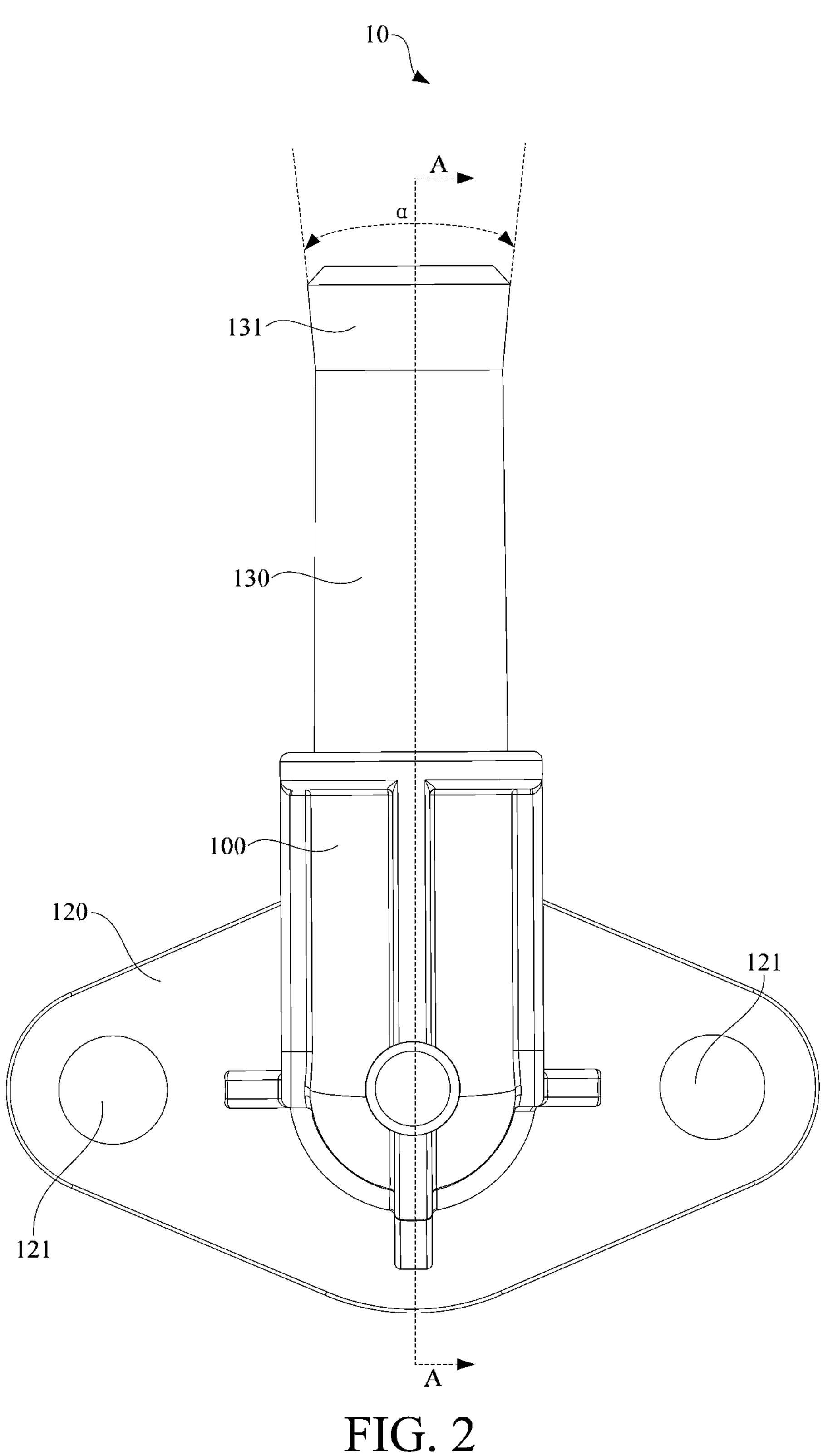
FIG. 2 is a front view of a pipeline fixing member according to an embodiment of the present disclosure.
Figure 3:
FIG. 3 is a cross-sectional view along a direction A-A in FIG. 2.
Figure 3:
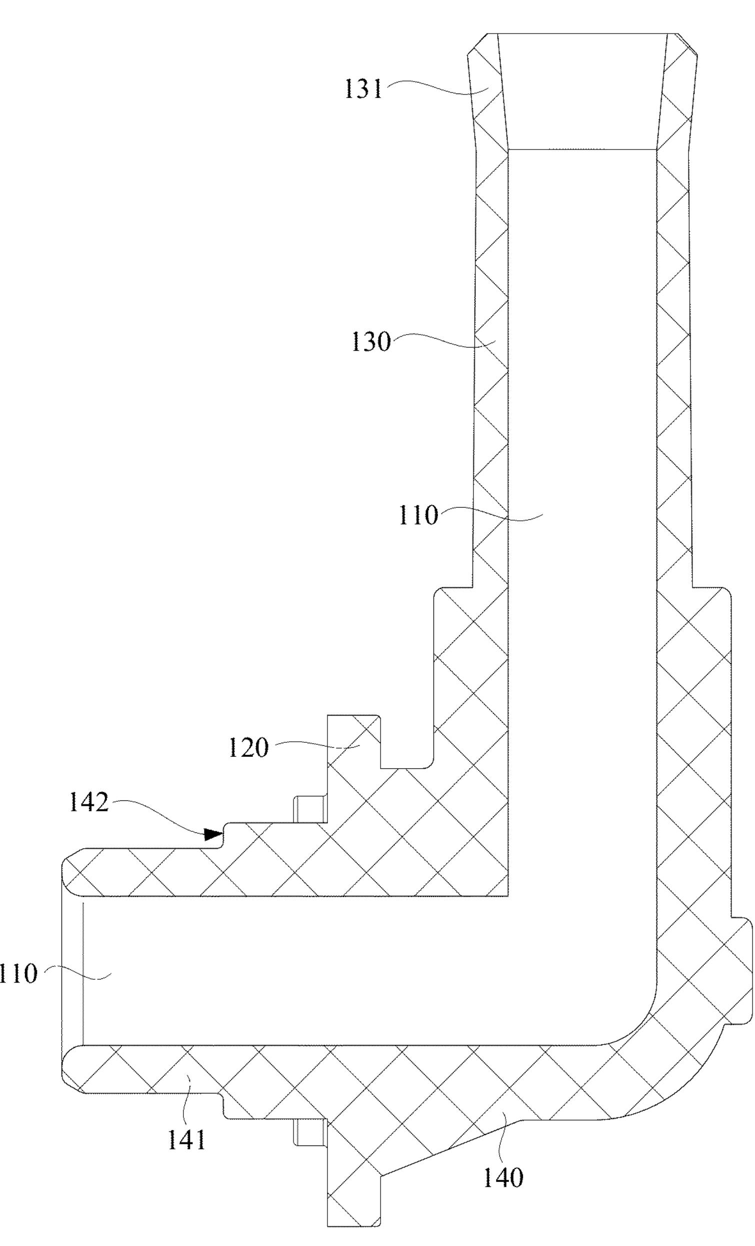
Figure 4:
FIG. 4 is a schematic structural diagram of a vehicle system according to an embodiment of the present disclosure.
Figure 4:
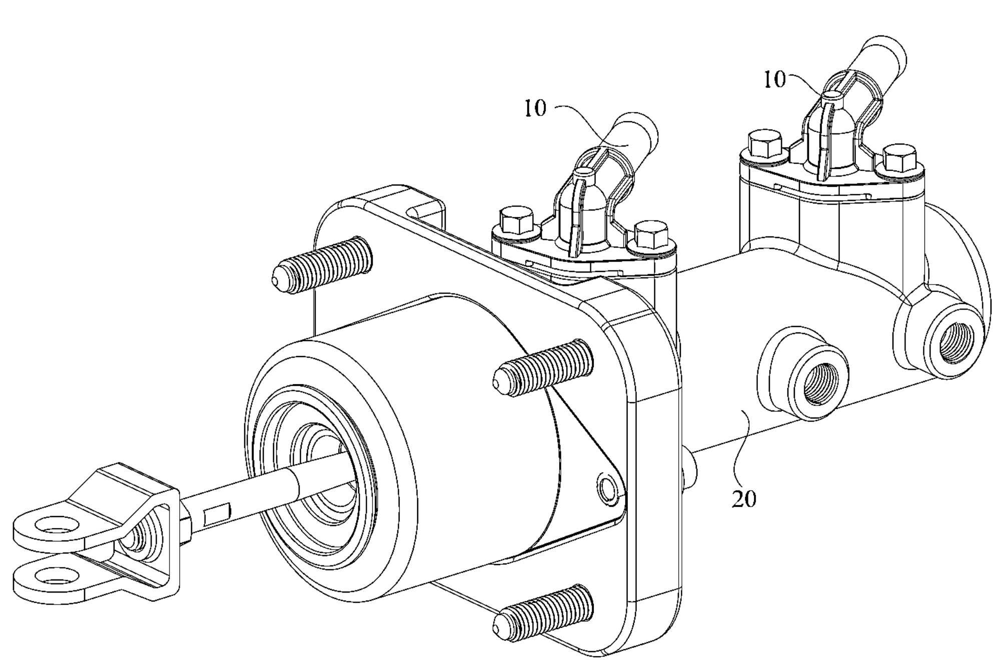
Figure 5:
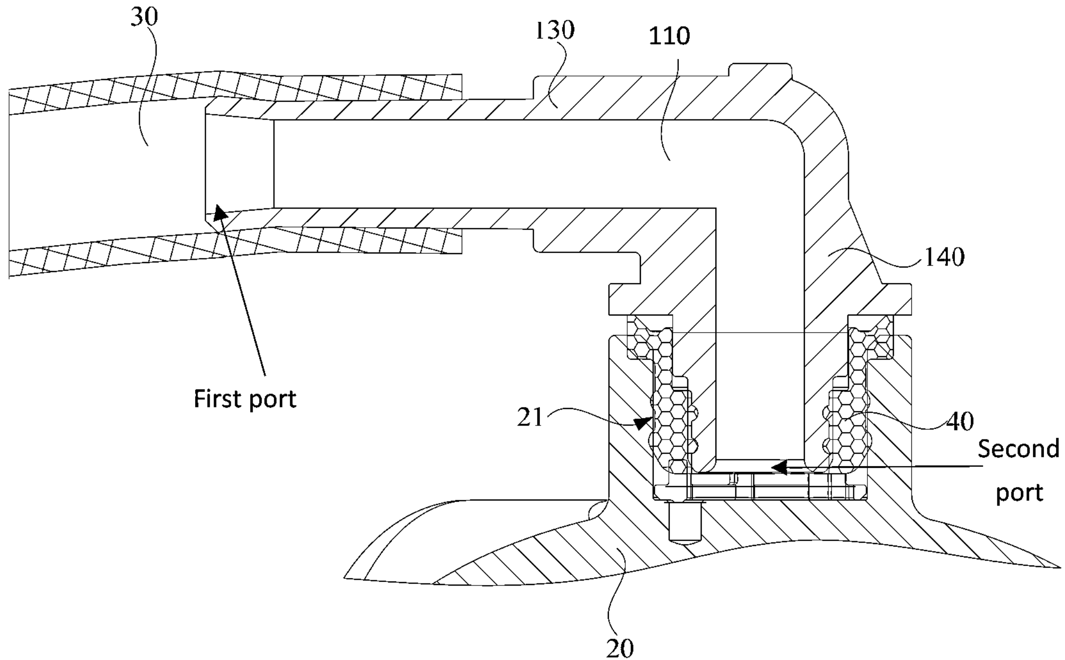
FIG. 5 is a partial cross-sectional view of a vehicle system according to an embodiment of the present disclosure.

FIG. 1 is a schematic structural diagram of a pipeline fixing member 10 according to an embodiment of the present disclosure. FIG. 2 is a front view of a pipeline fixing member 10 according to an embodiment of the present disclosure. FIG. 3 is a cross-sectional view along a direction A-A in FIG. 2. FIG. 4 is a schematic structural diagram of a vehicle system 1 according to an embodiment of the present disclosure. FIG. 5 is a partial cross-sectional view of a vehicle system 1 according to an embodiment of the present disclosure. The following describes the pipeline fixing member 10 according to an embodiment of the present disclosure with reference to FIG. 1 to FIG. 5. The pipeline fixing member 10 includes a fixing member body 100. The fixing member body 100 has a flow channel 110 and a first port and a second port located at both ends of the flow channel 110, respectively. The first port is adapted/configured to be fixedly connected to a pipeline 30 of the vehicle system 1. The second port is adapted to be in communication with a cylinder block 20 of the vehicle system 1. The fixing member body 100 has a mounting portion 120 fixedly connected to the cylinder block 20 of the vehicle system 1.

In an embodiment, the vehicle system 1 may be understood as a brake system of a vehicle. The cylinder block 20 of the vehicle system 1 may be understood as a hydraulic brake cylinder in the brake system. For example, the cylinder block 20 may be a mechanical brake cylinder connected to a pedal for mechanical braking, or a drive-by-wire brake cylinder with a piston pump for drive-by-wire braking. The cylinder block 20 is a pressure conversion component in the vehicle system 1. The cylinder block 20 may convert mechanical power transmitted from a brake pedal of the vehicle into hydraulic pressure, and then transmit the hydraulic pressure to brake wheel cylinders of four wheels of the vehicle through the pipeline 30. The brake wheel cylinders convert the hydraulic energy into mechanical energy. Finally, resistance is generated by means of friction between a brake pad and a brake disc, to force the wheels to decelerate or stop the vehicle. The cylinder block 20 needs to be in communication with a fluid reservoir (not shown in the figure) that stores brake fluid in the vehicle, so that the brake fluid may flow from the fluid reservoir into the cylinder block 20. The fixing member body 100 may be connected to the cylinder block 20 in a detachable manner. In an embodiment, a connection manner may be threaded connection.

The fixing member body 100 is adapted to be mounted on the cylinder block 20 of the vehicle system 1. The fixing member body 100 is configured for mounting the pipeline 30 (the pipeline 30 of the vehicle system 1) to cause/configure the cylinder block 20 to be in communication with the pipeline 30. The fixing member body 100 has the mounting portion 120 that limits rotation of the pipeline 30. The mounting portion 120 is adapted to be connected to the cylinder block 20. One end of the fixing member body 100 may be in communication with the cylinder block 20, and the other end of the fixing member body 100 may be in communication with the pipeline 30 of the fluid reservoir. With such an arrangement/configuration, the pipeline 30 can be in communication with the cylinder block 20 through the pipeline fixing member 10, so that the brake fluid may flow into the cylinder block 20 through the pipeline 30 and the pipeline fixing member 10.

In an embodiment, the flow channel 110 may run through opposite ends of the fixing member body 100 along an axial direction of the fixing member body 100. One end of the flow channel 110 may be in communication with the pipeline 30, and the other end of the flow channel 110 may be in communication with the cylinder block 20. With such an arrangement, the brake fluid can flow from the pipeline 30 to the flow channel 110, and flow into the cylinder block 20 through the flow channel 110.

Further, the mounting portion 120 may be fixedly connected to the fixing member body 100 through integral formation. The mounting portion 120 may be fixedly connected to the cylinder block 20 through threaded connection, so that the mounting portion 120 can be relatively fixedly mounted on the cylinder block 20. With such an arrangement, rotation of the fixing member body 100 relative to the cylinder block 20 may be effectively limited by the mounting portion 120. In this way, stability and reliability may be improved when the pipeline 30 is connected to the cylinder block 20. Further, a phenomenon of rotation of the pipeline 30 relative to the cylinder block 20 is avoided, so that the brake fluid in the fluid reservoir may be ensured to flow into the cylinder block 20 in a relatively stable manner. In addition, an assembly manner between the mounting portion 120 and the cylinder block 20 provided in this embodiment of the present disclosure is relatively simple, and the mounting portion 120 and the cylinder block 20 may be easily disassembled from each other for repairing. In this way, subsequent repair and replacement costs may be greatly reduced.

In an embodiment, the pipeline fixing member 10 may be integrally formed through injection molding by using engineering plastics that is resistant to the brake fluid. A material such as nylon, PPS, or PPT may be selected as the engineering plastics, which is not defined in this embodiment of the present disclosure. With such an arrangement, manufacturing efficiency of the pipeline fixing member 10 can be effectively improved, production costs of the pipeline fixing member 10 can be reduced, and weight of the pipeline fixing member 10 can be effectively reduced.

According to the pipeline fixing member 10 provided in this embodiment of the present disclosure, the pipeline 30 is in communication with the cylinder block 20 through the fixing member body 100. In this way, connection reliability between the pipeline 30 and the cylinder block 20 can be effectively improved, to cause the brake fluid to stably flow into the cylinder block 20. With the arrangement of the mounting portion 120 on the fixing member body 100, rotation of the fixing member body 100 relative to the cylinder block 20 may be effectively limited, so that the stability and the reliability may be improved when the pipeline 30 is connected to the cylinder block 20. Further, the phenomenon of rotation of the pipeline 30 relative to the cylinder block 20 is avoided, so that the brake fluid in the fluid reservoir may be ensured to flow into the cylinder block 20 in a relatively stable manner. In addition, the assembly manner between the mounting portion 120 and the cylinder block 20 provided in this embodiment of the present disclosure is relatively simple, and the mounting portion 120 and the cylinder block 20 may be easily disassembled from each other for repairing. In this way, the subsequent repair and replacement costs may be greatly reduced. In addition, the pipeline fixing member 10 provided in the present disclosure further has relatively high adaptability. The pipeline fixing member 10 may be matched with and adapted to different sizes of pipelines 30.

Still referring to FIG. 1 to FIG. 3, in an embodiment of the present disclosure, the mounting portion 120 is arranged/disposed on an outer peripheral wall of the fixing member body 100. The mounting portion 120 may be arranged along a circumferential direction of the fixing member body 100. The mounting portion 120 may extend along a radial direction of the fixing member body 100 toward a direction far from the fixing member body 100. The fixing member body 100 may be fixedly connected to the cylinder block 20 through the mounting portion 120. With such an arrangement, rotation of the fixing member body 100 relative to the cylinder block 20 may be limited through the mounting portion 120, so that rotation of the pipeline 30 relative to the cylinder block 20 is further limited.

Still referring to FIG. 1 and FIG. 2, in an embodiment of the present disclosure, a cross section of the mounting portion 120 is configured as an elliptic cross section. In an embodiment, the mounting portion 120 may be fixedly connected to one end of the fixing member body 100 through integral formation. The cross section of the mounting portion 120 may be understood as a section of the mounting portion 120 along a radial direction of one end of the fixing member body 100 fixedly connected to the mounting portion 120. The cross section of the mounting portion 120 may be elliptic or approximately elliptic. With such an arrangement, positioning precision of the fixing member body 100 mounted on the cylinder block 20 can be effectively improved. In addition, a contact area between the fixing member body 100 and the cylinder block 20 may be effectively increased, so that connection strength and sealing property between the fixing member body 100 and the cylinder block 20 are improved.

Still referring to FIG. 1 to FIG. 3, in an embodiment of the present disclosure, a first port is configured as a hollow plug-in portion that is in plug-and-fit engagement with the pipeline 30 of the vehicle system 1, such that the hollow plug-in portion is plugged in and fitted with the pipeline. With such an arrangement, the pipeline 30 of the vehicle system 1 can be fixedly mounted on one end of the fixing member body 100 through the hollow plug-in portion.

Still referring to FIG. 1 to FIG. 3, in some embodiments of the present disclosure, the hollow plug-in portion is a first hollow shaft section 130. An outer wall of the first hollow shaft section 130 is configured to connect to an inner wall of the pipeline 30 of the vehicle system 1. In an embodiment, one end of the first hollow shaft section 130 may be inserted into the pipeline 30. With such an arrangement, the pipeline 30 of the vehicle system 1 can tightly sleeve over the end of the first hollow shaft section 130, so that connection strength between the pipeline 30 and the first hollow shaft section 130 may further be effectively improved.

Still referring to FIG. 1 to FIG. 3, in a possible implementation of the present disclosure, one end (e.g., a first end) of the first hollow shaft section 130 far from the mounting portion 120 has a limiting flange 131 matched with the pipeline 30 of the vehicle system 1.

In an embodiment, the end of the first hollow shaft section 130 away from the mounting portion 120 may be configured for mounting the pipeline 30 and in communication with the pipeline 30. The limiting flange 131 may be arranged at the end of the first hollow shaft section 130 away from the mounting portion 120. With such an arrangement, the pipeline 30 can be clamped with, fixedly connected to, and in communication with the fixing member body 100 through the limiting flange 131.

Still referring to FIG. 1 to FIG. 3, in some embodiments of the present disclosure, an outer surface of the limiting flange 131 is configured as an inclined surface, and in a direction from an end of the first hollow shaft section 130 far from the mounting portion 120 to an end (e.g., a second end) of the first hollow shaft section 130 close to the mounting portion 120, the outer surface of the limiting flange 131 slopes toward an axial direction of the first hollow shaft section 130.

In an embodiment, the limiting flange 131 may have a tapered structure. Any two opposite beveled edges of the limiting flange 131 is obliquely arranged, and an angle $\alpha$ shown in FIG. 2 is formed between the two edges. In addition, the angle $\alpha$ may range from 8 degrees to 12 degrees. In an embodiment, the angle $\alpha$ may be 10 degrees. With such an arrangement, the pipeline 30 can be relatively securely mounted on an end of the fixing member body 100. In this way, sealing performance between the pipeline 30 and the fixing member body 100 may be greatly improved.

Still referring to FIG. 1, FIG. 3, and FIG. 5, in an embodiment of the present disclosure, the fixing body member 100 has a second hollow shaft section 140. The second hollow shaft section 140 is configured as a second port. The first hollow shaft section 130 is in communication with the second hollow shaft section 140. The second hollow shaft section 140 is adapted to be in plug-and-fit engagement with the cylinder block 20 of the vehicle system 1.

In an embodiment, the first hollow shaft section 130 and the second hollow shaft section 140 may be fixedly connected through integral formation. One end of the first hollow shaft section 130 away from the second hollow shaft section 140 may be configured for mounting the pipeline 30, to cause the first hollow shaft section 130 to be in communication with the pipeline 30. A mounting portion 120 may be arranged at one end of the second hollow shaft section 140 away from the first hollow shaft section 130. The second hollow shaft section 140 is connected to and in communication with the cylinder block 20 through the mounting portion 120. With such an arrangement, the pipeline 30 can be in communication with the cylinder block 20 by means of mutual cooperation of the first hollow shaft section 130 and the second hollow shaft section 140.

Still referring to FIG. 3, in a further embodiment of the present disclosure, an included angle is formed between an axis of the first hollow shaft section 130 and an axis of the second hollow shaft section 140. The axis of the first hollow shaft section 130 is perpendicular to the axis of the second hollow shaft section 140.

In an embodiment, an included angle between a central axis of the first hollow shaft section 130 and a central axis of the second hollow shaft section 140 may be 90 degrees. In other words, the first hollow shaft section 130 and the second hollow shaft section 140 may be perpendicular to each other. With such an arrangement, an axial length of the fixing member body 100 can be effectively reduced, thereby avoiding occupying excessive working space by the fixing member body 100.

Still referring to FIG. 1 and FIG. 2, in an embodiment of the present disclosure, the mounting portion 120 is arranged on the second hollow shaft section 140 and is integrally formed with the second hollow shaft section 140.

In an embodiment, the mounting portion 120 may be arranged through integral formation at one end of the second hollow shaft section 140 away from the first hollow shaft section 130. With such an arrangement, production and manufacturing efficiency of the second hollow shaft section 140 can be effectively improved.

Still referring to FIG. 1 and FIG. 2, in an embodiment of the present disclosure, the mounting portion 120 is arranged on an outer peripheral wall of the second hollow shaft section 140. The mounting portion 120 has a plurality of mounting holes 121. The plurality of mounting holes 121 are configured for assembling of the cylinder block 20. The plurality of mounting holes 121 are symmetrical with respect to the central axis of the second hollow shaft section 140.

In an embodiment, the mounting portion 120 may be provided with the plurality of mounting holes 121, for example, two, three, four, or the like, which is not defined in this embodiment of the present disclosure. The following embodiment is described by using two mounting holes 121 as an example. The mounting hole 121 may be circular in shape. An axial direction of the mounting hole 121 may be parallel to an axial direction of the second hollow shaft section 140. The mounting hole 121 may be a through hole or a threaded hole that extends through the mounting portion 120. The two mounting holes 121 may be distributed on both sides of the mounting portion 120 in a centrosymmetric manner, and a center of symmetry of the two mounting holes 121 may coincide with the central axis of the second hollow shaft section 140. The mounting portion 120 may be fixedly mounted on the cylinder block 20 through a bolt (not shown in the figure) passing through the mounting hole 121. With such an arrangement, the second hollow shaft section 140 can be stably connected to the cylinder block 20, and circumferential sealing performance between the second hollow shaft section 140 and the cylinder block 20 can be relatively high.

Further, a plurality of threaded counterbore holes (not shown in the figure) may be provided on the cylinder block 20, and the plurality of threaded counterbore holes may be respectively provided in a one-to-one correspondence with the plurality of mounting holes 121. The bolt (not shown in the figure) may pass through the mounting holes 121 and are screwed in the threaded counterbore holes, so that the second hollow shaft section 140 may be fixedly connected to the cylinder block 20 through bolted connection.

Still referring to FIG. 3, in some embodiments of the present disclosure, the outer peripheral wall of the second hollow shaft section 140 has an annular step structure 141, and the annular step structure 141 is arranged close to the first hollow shaft section 130, so that a step surface on the outer peripheral wall of the second hollow shaft section 140 is formed.

In an embodiment, a central axis of the annular step structure 141 may coincide with the central axis of the second hollow shaft section 140. Along an axial direction of the second hollow shaft section 140, an outer diameter size of the annular step structure 141 changes. In other words, the outer diameter size of the annular step structure 141 at one end of the second hollow shaft section 140 close to the first hollow shaft section 130 is greater than the outer diameter size of the annular step structure 141 at the other end of the second hollow shaft section 140 away from the first hollow shaft section 130. With such an arrangement, the annular step structure 141 forms an annular step surface 142 extending along a radial direction of the second hollow shaft section 140. The annular step surface 142 may be configured to improve axial sealing performance between the fixing member body 100 and the cylinder block 20.

Still referring to FIG. 4 and FIG. 5, a vehicle system 1 provided according to an embodiment of the present disclosure includes: a cylinder block 20, where the cylinder block 20 is the cylinder block 20 of the vehicle system 1 in the foregoing embodiments, and the cylinder block 20 defines an assembly hole 21; a sealing sleeve 40, where the sealing sleeve is mounted in the assembly hole 21; and a pipeline 30 and a pipeline fixing member 10, where the pipeline fixing member 10 is the pipeline fixing member 10 in the foregoing embodiments. The sealing sleeve 40 is sleeved over the pipeline fixing member 10 to hermetically connect the cylinder block 20 to the pipeline fixing member 10. The pipeline 30 is the pipeline 30 of the vehicle system 1 in the foregoing embodiment. The pipeline 30 is mounted on the pipeline fixing member 10, to cause the pipeline fixing member 10 to be in communication with the cylinder block 20 and the pipeline 30. A structure and working principles of the pipeline fixing member 10 are already explained and described in detail in the foregoing embodiments, and details are not described herein again.

In an embodiment, the cylinder block 20 may be the cylinder block 20 of the vehicle system 1 in the foregoing embodiments. The cylinder block 20 has an assembly hole 21 in communication with the interior of the cylinder block 20. The assembly hole 21 may be configured to mount the pipeline fixing member 10. The sealing sleeve 40 may be an annular sealing member. The sealing sleeve 40 may be sheathed in the assembly hole 21 through interference fit. One end of the pipeline fixing member 10 may be sheathed in the assembly hole 21, and in addition, the sealing sleeve 40 may sleeve over an outer side wall of the pipeline fixing member 10. With such an arrangement, axial and radial sealing performance between the pipeline fixing member 10 and the assembly hole 21 can be greatly improved through joint cooperation of the sealing sleeve 40 and the annular step structure 141, so that a phenomenon of leakage of air or brake fluid from a clearance between the pipeline fixing member 10 and the assembly hole 21 is avoided.

Further, the pipeline 30 may be mounted on the other end of the pipeline fixing member 10 away from the cylinder block 20, and the pipeline 30, the pipeline fixing member 10, and the assembly hole 21 are in communication in sequence. With such an arrangement, the brake fluid contained in the fluid reservoir can flow into the cylinder block 20 through the pipeline 30 and the pipeline fixing member 10.

A vehicle provided according to an embodiment of the present disclosure includes the vehicle system 1 in the foregoing embodiments. The structure and working principles of the vehicle system 1 are already explained and described in detail in the foregoing embodiments, and details are not described herein again.

In the description of the present disclosure, it should be understood that an orientation or position relationship indicated by terms such as "center", "longitudinal", "transverse", "length", "width", "thickness", "above/over/on", "below/under/beneath", "front", "rear", "left", "right", "vertical", "horizontal", "top", "bottom", "inner", "outer", "clockwise", "anticlockwise", "axial", "radial", and "circumferential" is an orientation or position relationship based on what is shown in the accompanying drawings, and is merely for ease of describing the present disclosure and simplifying the description, but does not indicate or imply that the indicated apparatus or component needs to have an orientation, and is constructed and operated in the orientation, and therefore cannot be understood as a limitation to the present disclosure.

In addition, terms "first" and "second" are for a purpose of description only, and cannot be understood as indicating or implying relative importance or implicitly indicating a number of indicated technical features. In view of this, a feature defined to be "first" or "second" may explicitly or implicitly include one or more features. In the description of the present disclosure, unless otherwise explicitly and defined, "a plurality of/a number of" means more than two.

In the present disclosure, unless otherwise clearly specified and defined, terms such as "mount", "in communication with", "connect", and "fix" should be understood in a broad sense. For example, the term "connect" may be fixedly connected, detachably connected, or integrally connected. Alternatively, the term "connect" may be mechanically connected, or electrically connected. The term "in communication with" may be in direct communication with, in indirect communication with through an intermediate medium, in internal communication with between interiors of two components, or two components in mutual communication with each other. A person of ordinary skill in the art may understand the meanings of the foregoing terms in the present disclosure according to situations.

In the present disclosure, unless otherwise clearly specified and defined, that a first feature being "above" or "below" a second feature may be that the first feature and the second feature are in direct contact, or the first feature and the second feature are in indirect contact by an intermediate medium. In addition, the first feature is "above", "over", and "on" the second feature may be that the first feature is directly above/over/on or obliquely above/over/on the second feature, or may merely indicate that a horizontal position of the first feature is higher than the horizontal position of the second feature. The first feature is "below", "under", and "beneath" the second feature may be that the first feature is directly below/under/beneath or obliquely below/under/beneath the second feature, or may merely indicate that the horizontal position of the first feature is lower than the horizontal position of the second feature.

In description of this specification, description of reference terms such as "one embodiment", "some embodiments", "example", "specific example" or "some examples" indicates including features, structures, materials, or features described in the embodiment or example in at least one embodiment or example of the present disclosure. In this specification, schematic representations of the foregoing terms are not necessarily directed to the same embodiments or examples. Further, the features, the structures, the materials, or the characteristics that are described may be combined in proper manners in any one or more embodiments or examples. In addition, a person skilled in the art may integrate or combine different embodiments or examples described in this specification and features of the different embodiments or examples provided that they are not contradictory to each other.

Although the embodiments of the present disclosure are shown and described above, it may be understood that, the foregoing embodiments are examples, and cannot be construed as a limitation to the present disclosure. Within the scope of the present disclosure, a person of ordinary skill in the art may make changes, modifications, replacement, and variations to the foregoing embodiments.

What is claimed is:

1. A pipeline fixing member, comprising:

a fixing member body having a mounting portion, a flow channel, a first port, and a second port, the first port and the second port respectively located at both ends of the flow channel, the first port configured to be connected to a pipeline of a vehicle system, the second port configured to be in communication with a cylinder block of the vehicle system, and the mounting portion connected to the cylinder block, wherein the first port is configured as a hollow plug-in portion that is plugged in and fitted with the pipeline, the hollow plug-in portion is a first hollow shaft section, and an outer wall of the first hollow shaft section is configured to be connected to an inner wall of the pipeline, a first end of the first hollow shaft section far from the mounting portion has a limiting flange matched with the pipeline, and an outer surface of the limiting flange is configured as an inclined surface, and the outer surface of the limiting flange slopes toward an axial direction of the first hollow shaft section and in a direction from the first end of the first hollow shaft section to a second end of the first hollow shaft section close to the mounting portion.

2. The pipeline fixing member according to claim 1, wherein the fixing member body has a second hollow shaft section configured as the second port, the first hollow shaft section is in communication with the second hollow shaft section, and the second hollow shaft section is configured to be plugged in and fitted with the cylinder block.

3. The pipeline fixing member according to claim 2, wherein an included angle is formed between an axis of the first hollow shaft section and an axis of the second hollow shaft section.

4. The pipeline fixing member according to claim 3, wherein the axis of the first hollow shaft section is perpendicular to the axis of the second hollow shaft section.

5. The pipeline fixing member according to claim 2, wherein the mounting portion is disposed in the second hollow shaft section and is integrally formed with the second hollow shaft section.

6. The pipeline fixing member according to claim 5, wherein the mounting portion is disposed on an outer peripheral wall of the second hollow shaft section, the mounting portion has a plurality of mounting holes, and the mounting holes are symmetrical with respect to a central axis of the second hollow shaft section.

7. The pipeline fixing member according to claim 6, wherein the outer peripheral wall of the second hollow shaft section has an annular step structure, and the annular step structure is disposed close to the first hollow shaft section, to form a step surface on the outer peripheral wall of the second hollow shaft section.

8. A vehicle system, comprising:

a cylinder block having an assembly hole;

a sealing sleeve mounted in the assembly hole; and a pipeline and a pipeline fixing member, the sealing sleeve sleeved over the pipeline fixing member to connect the cylinder block to the pipeline fixing member, and the pipeline mounted to the pipeline fixing member to configure the pipeline fixing member to be in communication with the cylinder block and the pipeline, wherein the pipeline fixing member comprises:

a fixing member body having a mounting portion, a flow channel, a first port, and a second port, the first port and the second port respectively located at both ends of the flow channel, the first port configured to be connected to the pipeline, the second port configured to be in communication with the cylinder block, and the mounting portion connected to the cylinder block, wherein the first port is configured as a hollow plug-in portion that is plugged in and fitted with the pipeline, the hollow plug-in portion is a first hollow shaft section, and an outer wall of the first hollow shaft section is configured to be connected to an inner wall of the pipeline, a first end of the first hollow shaft section far from the mounting portion has a limiting flange matched with the pipeline, and an outer surface of the limiting flange is configured as an inclined surface, and the outer surface of the limiting flange slopes toward an axial direction of the first hollow shaft section and in a direction from the first end of the first hollow shaft section to a second end of the first hollow shaft section close to the mounting portion.

9. The vehicle system according to claim 8, wherein the fixing member body has a second hollow shaft section configured as the second port, the first hollow shaft section is in communication with the second hollow shaft section, and the second hollow shaft section is configured to be plugged in and fitted with the cylinder block.

10. The vehicle system according to claim 9, wherein an included angle is formed between an axis of the first hollow shaft section and an axis of the second hollow shaft section.

11. The vehicle system according to claim 10, wherein the axis of the first hollow shaft section is perpendicular to the axis of the second hollow shaft section.

12. The vehicle system according to claim 9, wherein the mounting portion is disposed in the second hollow shaft section and is integrally formed with the second hollow shaft section.

13. The vehicle system according to claim 12, wherein the mounting portion is disposed on an outer peripheral wall of the second hollow shaft section, the mounting portion has a plurality of mounting holes, and the mounting holes are symmetrical with respect to a central axis of the second hollow shaft section.

14. The vehicle system according to claim 13, wherein the outer peripheral wall of the second hollow shaft section has an annular step structure, and the annular step structure is disposed close to the first hollow shaft section, to form a step surface on the outer peripheral wall of the second hollow shaft section.

15. The vehicle system according to claim 8, wherein the cylinder block is a cylinder block of a hydraulic brake cylinder.

16. A vehicle, comprising a vehicle system, the vehicle system comprising:

a cylinder block having an assembly hole;

a sealing sleeve mounted in the assembly hole; and a pipeline and a pipeline fixing member, the sealing sleeve sleeved over the pipeline fixing member to connect the cylinder block to the pipeline fixing member, and the pipeline mounted to the pipeline fixing member to configure the pipeline fixing member to be in communication with the cylinder block and the pipeline, wherein the pipeline fixing member comprises:

a fixing member body having a mounting portion, a flow channel, a first port, and a second port, the first port and the second port respectively located at both ends of the flow channel, the first port configured to be connected to the pipeline, the second port configured to be in communication with the cylinder block, and the mounting portion connected to the cylinder block, wherein the first port is configured as a hollow plug-in portion that is plugged in and fitted with the pipeline, the hollow plug-in portion is a first hollow shaft section, and an outer wall of the first hollow shaft section is configured to be connected to an inner wall of the pipeline, a first end of the first hollow shaft section far from the mounting portion has a limiting flange matched with the pipeline, and an outer surface of the limiting flange is configured as an inclined surface, and the outer surface of the limiting flange slopes toward an axial direction of the first hollow shaft section and in a direction from the first end of the first hollow shaft section to a second end of the first hollow shaft section close to the mounting portion.

* * * * *